(12) United States Patent
Hou

(10) Patent No.: US 11,272,725 B2
(45) Date of Patent: Mar. 15, 2022

(54) LOW METHOXYL PECTIN FROM JELLY FIG AND METHOD FOR PRODUCING THE SAME

(71) Applicant: Shih-Kuo Hou, Taipei (TW)

(72) Inventor: Shih-Kuo Hou, Taipei (TW)

(*) Notice: Subject to any disclaimer, the term of this patent is extended or adjusted under 35 U.S.C. 154(b) by 0 days.

(21) Appl. No.: 16/861,644

(22) Filed: Apr. 29, 2020

(65) Prior Publication Data

US 2021/0068435 A1 Mar. 11, 2021

(30) Foreign Application Priority Data

Sep. 9, 2019 (TW) .................................. 108132478

(51) Int. Cl.
| | | |
|---|---|---|
| *A23L 21/12* | (2016.01) | |
| *A23L 29/231* | (2016.01) | |
| *B01D 21/01* | (2006.01) | |
| *B01D 11/02* | (2006.01) | |
| *B01D 21/26* | (2006.01) | |

(52) U.S. Cl.
CPC ........ *A23L 29/231* (2016.08); *B01D 11/0288* (2013.01); *B01D 21/01* (2013.01); *B01D 21/262* (2013.01); *A23L 21/12* (2016.08); *A23V 2002/00* (2013.01)

(58) Field of Classification Search
CPC .......... A23L 21/00; A23L 21/10; A23L 21/11; A23L 21/12; A23L 29/231; B01D 11/0288; B01D 21/01; B01D 21/262
See application file for complete search history.

(56) References Cited

U.S. PATENT DOCUMENTS

| | | |
|---|---|---|
| 2,358,430 A | 9/1944 | Willaman et al. |
| 2,478,170 A | 8/1949 | Maclay et al. |

FOREIGN PATENT DOCUMENTS

| | | |
|---|---|---|
| CN | 105829356 B | 1/2019 |
| EP | 3083703 A1 | 10/2016 |

OTHER PUBLICATIONS

Liang, R et al., "Extraction, characterization and spontaneous gel-forming property of pectin from creeping fig (*Ficus pumila* Linn.) seeds", 2012, Carbohydrate Polymers, vol. 87, pp. 76-83 (Year: 2012).*
Leong, N., "*Aloe vera* Lemongrass Aiyu Jelly by Nora Leong", 2015, <http://www.singaporehomecooks.com/2015/09/aloe-vera-lemongrass-aiyu-jelly-by-nora.html> (Year: 2015).*
Island Folklore, "Ice Jelly", 2018, <https://islandfolklore.com/ice-jelly/> (Year: 2018).*
Office Action with a search report from the Intellectual Property Office of Taiwan (IPO) for the corresponding Taiwan Patent Application No. 108132478; May 20, 2020.
Jiatong Chen et al., "The Most Shaking Aiyu Jelly in History," National Miaoli Agricultural and Industrial Food Processing Department, Mar. 2018.
Yung-chuan Huang et al., "A Study on the Mechanism of Gelatinization of Awkeo-Jelly," China Hort., 26(4), 1980, pp. 117-126 (.
Yung-chuan Huang et al., "On the Material Plant of Awkeo-Jeily: Ficus Awkeotsang Makino Its Historical Review and Future Prospects," J. Chinese Soc. Hort Sci., 25(4), 1979, pp. 103-111.
Bor-Hon, Lee; Studies on the jellying properties of Ficus awkeotsang makino achenes and the qualities of awkeo-jelly; 2000, pp. 7, 15 and 125.
Lin et al., "Distribution and Composition of Pectins in Sunflower Plants," Can J. Plant Sci., vol. 55, 1975, pp. 507-515, 9 pages.
Colin D. May, "Industrial Pectins: Sources, Production and Applications," Carbohydrate Polymers, vol. 12, 1990, pp. 79-99, 21 pages.
Huang et al., "A Study on the Mechanism of Gelatinization of Awkeo-Jelly," Chinese Horticulture, vol. 26, 1980, pp. 117-126, 10 pages.

* cited by examiner

*Primary Examiner* — Jeffrey P Mornhinweg
*Assistant Examiner* — Kelly P Kershaw
(74) *Attorney, Agent, or Firm* — Muncy, Geissler, Olds & Lowe, P.C.

(57) ABSTRACT

A jelly fig-derived low methoxyl pectin (LM pectin) and a method for producing the same are disclosed. The LM pectin has a relatively high average molecular weight, a relatively low esterification degree, and a relatively high galacturonic acid content. The LM pectin is made using raw materials of female syconium of jelly fig, particularly the three parts of achenes, pedicels, and sepals as a whole. The LM pectin can be used in preparing calcium pectate gel and/or as biomaterials for wide applications in the food and medical industries.

17 Claims, 3 Drawing Sheets

(a)

(b)

(a)

(b)

LOW METHOXYL PECTIN FROM JELLY FIG AND METHOD FOR PRODUCING THE SAME

FIELD OF THE INVENTION

The present invention relates to a low methoxyl pectin (LM pectin), which is made using a female syconium of jelly fig (*Ficus pumila* var. *awkeotsang*), particularly using its inner three parts of achenes, pedicels, and sepals in a whole as the pectin raw materials; and an enzymatic method for producing the same.

BACKGROUND OF THE INVENTION

Natural pectin is an acidic polysaccharide material in plants. Current commercially available pectin has a molecular weight of about 50,000 to about 300,000 daltons, and is widely applied in food, cosmetic, textile, and pharmaceutical industries and the like. Generally, pectins with an esterification degree of at least 50% are referred to as a high methoxyl pectin (HM pectin), and pectins with an esterification degree of less than 50% are referred to as LM pectin.

The raw materials used in the conventional pectin production are waste from juice and sugar beet sugar processing, such as orange peel, apple pomace, and sugar beet pulp, with the final product HM pectin used as a food additive, with its gelation of sugar-acid-model systems.

Commercially available LM pectin from modification of HM pectin can be used as a food additive for low-sugar processed foods such as low-sugar jams, but, even so, due to random deesterification without enough calcium-crossed structure, it does not qualify as a functional biomaterial. Concerning the requirements in sufficient gel strength and biocompatibility for biomaterials, both current technologies and raw materials used in pectin production are subject to the following constraints.

(1) During deesterification of HM pectin using bacterial or fungal pectin methylesterase, the methyl ester groups on the homogalacturonic acid backbone are attacked randomly, and converted to a random distribution of the free carboxyl groups, so that the final product LM pectin is insensitive to calcium and incapable of cross-linking by calcium ions to form a gel. For sunflower, white mold is the most destructive disease attacking the water-insoluble protopectin, consequently sunflower LM pectin product has no gelling effect of calcium ion cross-linked conformation (reference to prior art in: May 1990, Industrial pectins: Sources, production and applications, Carbohydrate Polymers 12 (1990)79-99).

(2) When sunflower heads are used as a raw material, an acid hydrolysis method is commonly adopted to extract the LM pectin at high temperatures and long reaction time, largely derived from the water-insoluble protopectin in a form of homogalacturonan-$Ca^{2+}$ gels in cell adhesion. Some prior art references have disclosed that reagents such as ammonium oxalate-oxalic acid and EDTA would sequester the calcium and magnesium to facilitate the solubilization of the pectins by the hot aqueous solvent (reference to the prior art in: LIN et. al. 1975, Distribution and composition of pectins in sunflower plants, Can. J. Plant Sci. 55:507-513). Thus, in pectin extraction without the described synergistic effects, chelating agents, such as sodium citrate, cannot achieve success (reference to the prior art in CN 105829356B).

(3) Deesterification of HM pectin uses a normally alkaline plant pectin methylesterase (plant PME), which is very sensitive to ionic environments, and is converted to exhibit positive charges under an acidic microenvironment. The positive charges instantly firmly bond with the negative charges of free carboxyl group ($COO^-$), so that the hydrolysis activity is restrained and deesterification stops immediately (reference to the prior art in U.S. Pat. No. 2,358,430A).

(4) Acid-catalyzed deesterification of HM pectin extraction solution or HM pectin-ethanol suspension solution is carried out at a constant high temperature under extremely acidic conditions, such that the methyl ester group can then be hydrolyzed, separated, and converted to a random distribution of free carboxyl groups. This method has disadvantages such as the requirement for complex manufacturing equipment, increased acid and base use, high energy consumption, highly sophisticated control systems, and environmental pollution. Even so, the resulting LM pectin product still lacks the gelling effect of calcium ion cross-linked conformation, due to its random distribution of the free carboxyl groups (reference to the prior art in EP 3083703A1).

(5) Alkaline-catalyzed deesterification of HM pectin is carried out at pH ranges from 10 to 12 and temperature ranges from 12° C. to 15° C., so as to obtain LM pectin. The alkaline hydrolysis, in fact a β-elimination reaction, during alkaline deesterification simultaneously declines pectin's molecular weight, viscosity, and gelling ability, with its LM pectin product still lacking calcium ion cross-linked conformation, due to random distribution of the free carboxyl groups (reference to the prior art in U.S. Pat. No. 2,478,170A).

In brief, a novel and natural LM pectin product of the "egg box" model gelling property of calcium ion cross-linked conformation, remains to be established. A total solution, including alternative sources of new pectin materials and an easier and environmentally friendly relevant process is thus called for.

A traditional Taiwanese confection, Awkeo/Aiyu jelly, is prepared by soaking the seeds of the indigenous fruit of the *Ficus pumila* var. *awkeotsang* (hereinafter "jelly fig") and kneading the extract into well water or tap water at room temperature, with gelation time around 20 min.

Huang et. al (A study on the mechanism of gelatinization of awkeo-jelly, 1980) suggested that the jelly is in fact a calcium pectate gel. Gelling system includes: water, HM pectin, LM pectin, pectin methylesterases, all from the jelly fig seeds and calcium ions partly derived from water.

While Huang discloses a gelling mechanism of the Awkeo/Aiyu jelly, no means of LM pectin production from the same jelly fig materials is addressed.

SUMMARY OF THE INVENTION

The gelling mechanism of Awkeo/Aiyu jelly also encounters the cross-linking between calcium ions and LM pectin converted through the deesterification.

In order to overcome the above obstacle, after considerable research, the inventor unexpectedly discovered a pure water extraction solution with sodium citrate as an anticoagulation agent applied in a one-step extraction. Deesterification and transacylation are effectively carried out in crude aqueous extract at room temperature, wherein two endogenous isozymes of pectin methylesterase I and pectin methylesterase II interact with the specific substrate HM pectin, with all interacting elements released from jelly fig materials simultaneously. Since sodium citrate has already created a non-calcium environment by binding the endogenous plant $Ca^{2+}$ into sodium calcium citrate complexes, efficiently converting endogenous HM pectin to work-in-process pectin with low methoxyl. Consequently, the present invention produces LM pectin with a block-wise distribution of free carboxyl groups in strong calcium-sensitivity, with the final product in liquid form or powder form.

The present invention uses female syconium of jelly fig, particularly its inner three parts of achenes, pedicels, and sepals in a whole as the pectin raw materials. A one-step extraction method for the production of the present invention includes water extraction, enzymatic deesterification, and anticoagulation, producing calcium-sensitive LM pectin with a block-wise distribution of free carboxyl groups, providing excellent properties of gel strength and biocompatibility potentially applicable to more value-added biological material purposes.

Accordingly, the present invention mainly aims to provide a method of producing an LM pectin of jelly fig, including the following steps:

(1) providing a jelly fig raw material including female syconium thereof;

(2) providing pure water as an extraction solution, in which sodium citrate is added as an anticoagulation agent and an organic acid is added to adjust the pH value of the anticoagulation extraction solution to about 6 to about 8;

(3) extracting the jelly fig raw material with the anticoagulation extraction solution at a temperature of about 20° C. to about 50° C. to obtain a crude aqueous extract of the jelly fig pectin; and (4) centrifuging the crude aqueous extract of jelly fig pectin to collect supernatant, recovery of pectin is to be performed with organic solvent precipitation, or both.

Another aim of the present invention is to provide a novel jelly fig-derived LM pectin, which has the following characteristics:

(1) an average molecular weight of at least about 300,000 daltons;

(2) an esterification degree of less than about 50%; and (3) a galacturonic acid content of at least about 65%.

A further aim of the present invention is to provide a novel jelly fig-derived LM pectin, which has the following characteristics:

(1) an average molecular weight of at least about 750,000 daltons;

(2) an esterification degree of about 31% or less; and (3) a galacturonic acid content of about 75% to about 90%.

BRIEF DESCRIPTION OF THE DRAWINGS

As shown in FIG. 1B, all wet beads remain intact after a finger-press test.

As shown in FIG. 3, all wet beads remain intact after a finger-press test.

DETAILED DESCRIPTION OF THE INVENTION

Figure 1:
FIG. 1 shows the morphology of stabilized and hardened calcium pectate gel beads, which were prepared by powder-type jelly fig-derived LM pectin in Example 3, wherein (a) shows the cross-linked beads prepared by dropping in 50 ppm calcium ions solution, and (b) shows the cross-linked beads prepared by dropping in 100 ppm calcium ions solution.
Figure 1:
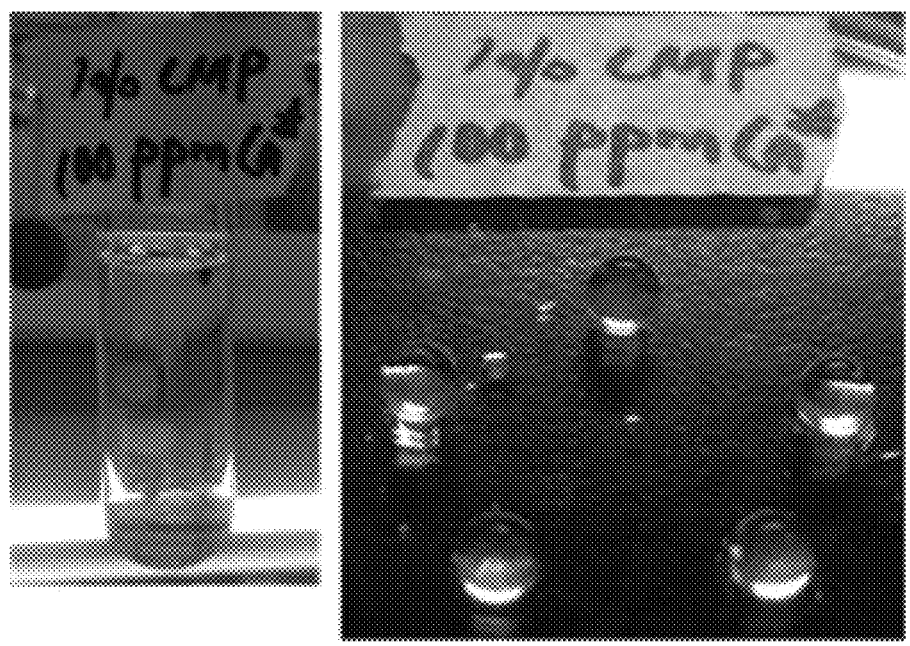

In this article, except for special limitation, singular form "a" and "the" also includes the plural form, any and all embodiments and illustrative terms ("for example" and "such as") in this article aim to make the present invention more prominent rather than limiting the range of the present invention, the terms in the specification of the case should not be regarded as implying any unclaimed methods and conditions may constitute necessary characteristics for the implementation of the present invention.

The method of producing an LM pectin of the present invention includes the steps of:

(1) providing a jelly fig raw material including dry or fresh jelly fig female syconium, preferably its three parts of achenes, pedicels, and sepals in the female syconium as a whole;

(2) providing pure water, preferably deionized water, reverse osmosis water, or distilled water to serve as the water extraction solution, wherein sodium citrate is added as an anticoagulation agent, and an organic acid, such as citric acid, is added to adjust the anticoagulation extraction solution to a pH value of about 6 to about 8, and preferably 7.5;

(3) under a temperature range of about 20° C. to 50° C., preferably room temperature, extracting the jelly fig raw materials by the anticoagulation extraction solution to obtain a crude aqueous extract including a HM pectin and two types of endogenous pectin methylesterases, wherein quick interactions are spontaneously accomplished in enzymatic deesterification and transacylation between the HM pectin and two types of endogenous pectin methylesterases; and (4) centrifuging the crude aqueous extract to collect its supernatant wherein the LM pectin product is successfully converted from the native plant HM pectin, and/or collect its floccules of LM pectin by precipitating the supernatant in organic solvent, such as ethanol.

The supernatant obtained through the method of the present invention may serve as a liquid-type jelly fig-derived LM pectin product, which has an average molecular weight of at least about 300,000 daltons or at least about 400,000 daltons or at least about 500,000 daltons or at least about 600,000 daltons or at least about 700,000 daltons, preferably at least about 750,000 daltons, or more preferably at least about 800,000 daltons; an esterification degree of less than 50% or less than 40%, preferably less than 35%, and more preferably less than 31% or less; and a galacturonic acid content of at least about 65% or at least about 70%, preferably at least about 75% and more preferably about 75% to about 90%, so as to be applied to downstream processed food/biomedical industries or directly consumed by customers.

The LM pectin floccules obtained by the method of the present invention may be centrifuged, lightly compacted, dried and ground into powder to serve as a powder-type jelly fig-derived LM pectin product, which has an average molecular weight of at least about 300,000 daltons or at least about 400,000 daltons or at least about 500,000 daltons or at least about 600,000 daltons or at least about 700,000 daltons, preferably at least about 750,000 daltons and more preferably at least about 800,000 daltons; an esterification degree of less than 50% or less than 40%, preferably less than 35%, and more preferably less than 31% or less; and a galacturonic acid content of at least about 65% or at least about 70%, preferably at least about 75% and more preferably about 75% to about 90%, so as to be applied to downstream processed food/biomedical industries or directly consumed by customers.

In the method of the present invention, there is no upper limit to consumption of the pure water extraction solution and the sodium citrate used for each batch extraction of the jelly fig raw materials, as long as the crude aqueous extract contains the preset content of HM pectin and the two types of endogenous pectin methylesterases work effectively and economically in practice.

The dosing ratios of raw materials, sodium citrate, and pure water extraction solution for more preferable and optimal embodiments are shown in Table 1. The pre-set proportion aims to obtain its preset yield from the crude aqueous extract and achieve a minimum consumption of solvent in the subsequent process.

TABLE 1

| Jelly fig raw materials (fresh weight to dry weight = about 100:40 (M) | | Anticoagulation extraction solution | | dosing ratios (M):(S):(W) |
|---|---|---|---|---|
| | | Sodium citrate (S) | Pure water extraction solution (W) | |
| Dry raw material (calcium content about 947.1 mg per 100 g) | Optimal | 5 g | 1 g | 50 ml | 5:1:50* |
| | More preferable | 4-7 g | 1 g | 40-70 ml | 4-7:1:40-70 |
| | Preferable | 3-8 g | 1 g | 30-80 ml | 3-8:1:30-80 |
| Fresh raw material (calcium content about 378.8 mg per 100 g) | Optimal | 12.5 g | 1 g | 50 ml | 12.5:1:50** |
| | More preferable | 10-17.5 g | 1 g | 40-70 ml | 10-17.5:1:40-70 |
| | Preferable | 7.5-20 g | 1 g | 30-80 ml | 7.5-20:1:30-80 |

*Optimal dosing ratio of the dry raw material to the sodium citrate to the anticoagulation extraction solution = 5 g:1 g:50 ml, through calculation, the ratio of endogenous calcium ions in the raw material to sodium ions contained in the sodium citrate is equal to calcium 47.4 mg to sodium 234.5 mg (that is, when the sodium ions are about 5 times of the calcium ions, the optimal calcium chelating anticoagulation effect is realized). The volume of the anticoagulation extraction solution is preferably 10 times (v/w) the weight of the dry raw material, to reduce the solvent used for pectin precipitation. (*the dosing ratio of the dry raw material to the sodium citrate to the anticoagulation extraction liquid = 5 g:1 g:50 ml)
Taking the ratio of the fresh weight to the dry weight of the jelly fig raw materials as 100:40, in the optimal proportion of the fresh raw material to the sodium citrate to the anticoagulation extraction solution = 12.5 g:1 g:50 ml, through calculation, the ratio of endogenous calcium ions in the raw material to sodium ions contained in the sodium citrate is equal to calcium 47.4 mg to sodium 234.5 mg (that is, when the sodium ions are about 5 times the calcium ions, the optimal calcium chelating anticoagulation effect is realized). The volume of the anticoagulation extraction solution is preferably 4 times (v/w) of the weight of the fresh raw material, to reduce the solvent used for pectin precipitation. (taking the ratio of the fresh weight to the dry weight of the jelly fig raw materials as about 100:40, the ratio of the fresh raw material to the sodium citrate to the anticoagulation extraction liquid = 12.5 g:1 g:50 ml)

The jelly fig materials adopted in step (1) can be either fresh or dried. The dosing of raw materials is as per the ratio of fresh to dried 100:40 (w/w). A stainless grapefruit spoon can easily scrape out all achenes, pedicels, and sepals simultaneously from inside of the syconium fruit, which are then put into a nylon filter bag of sieve pore size between 200 and 400 meshes, to be ready for follow-up extraction.

In step (2), in order to provide the optimal active environment for enzymatic hydrolysis, the pH value of the anticoagulation extraction solution is adjusted by an organic acid, such as citrate acid, to about 6 to about 8, preferably about 7 to about 8, and more preferably about 7.5. Accordingly the specific deesterification and transacylation are effectively carried out by the isozymes of pectin methylesterase I and pectin methylesterase II against their substrate HM pectin, with all interactive elements released from the jelly fig materials into the crude aqueous extract together.

In addition, in some embodiments of the present invention, the anticoagulation extraction solutions for extracting the jelly fig raw materials comprise pure water, preferably deionized water, reverse osmosis water, or distilled water, wherein sodium citrate is added as an anticoagulation agent, and the dosing ratios are as follows:

(1) the dosing ratios (w/w) of the fresh materials to the sodium citrate may be about 1:20 to about 20:1, about 1:15 to about 15:1, about 1:12.5 to about 12.5:1, and preferably about 12.5:1; and (2) the dosing ratios (w/w) of the dry materials to the sodium citrate may be about 1:10 to about 10:1, about 1:8 to about 8:1, about 1:5 to about 5:1, and preferably about 5:1.

In order to minimize consumption of the solvent used in pectin precipitation, the dosing ratios (w/v) of the dry raw materials to the anticoagulation extraction solution may be about 1:200 to about 1:5 or about 1:150 to about 1:5 or about 1:100 to about 1:5, preferably about 1:20, and more preferably 1:10; the dosing ratios (w/v) of the fresh raw materials to the anticoagulation extraction solution may be about 1:150 to about 1:2 or about 1:100 to about 1:2 or about 1:50 to about 1:2, preferably about 1:3, and more preferably about 1:4.

In step (3), at the temperature of about 20° C. to 50° C., preferably about 25° C. to about 40° C., more preferably at room temperature, the nylon filter bag filled with the jelly fig raw materials is placed into the anticoagulation extraction solution and kneaded by hand for a period of time, about 1 minute to about 20 minutes or about 3 minutes to about 15 minutes or preferably about 5 minutes to about 10 minutes, preferably about 6 minutes to about 8 minutes, and more preferably about 7 minutes; or extracted in a mechanical device for a period of time, about 1 minute to about 2 hours, preferably about 6 minutes to about 15 minutes, and more preferably about 7 minutes. Within the obtained crude aqueous extract, the specific deesterification and transacylation are effectively carried out by the endogenous isozymes of pectin methylesterase I and pectin methylesterase II against their substrate HM pectin, with all interactive elements were released from the jelly fig materials together. Owing to the free calcium ions ($Ca^{2+}$) simultaneously released into the crude aqueous extract of the raw materials had already been bonded as sodium calcium citrate complexes by anticoagulation of sodium citrate, consequently allowing the work-in-process LM pectin successfully converted in the crude aqueous extract by the effects of deesterification and transacylation and keeping its gelling specificity into the final products with divalent ion cross-linking effect. The yield rate of LM pectin in powder form is at about 6% to about 8%. Due to room temperature treatment, the endogenous isozymes of jelly fig materials work at optimal activity and ensure pectin final products with high gelling strength and biocompatibility.

Any known appropriate solvents, such as alcohol and acetone, preferably 95% alcohol, in this field may be adopted in pectin precipitation in step (4) to be mixed with supernatant of the same volume, whereby LM pectin floccules are precipitated.

In the method of the present invention, centrifugal operation for obtaining the precipitated LM pectin floccules may be carried out by any mode or device in the field, for example, the above centrifuge centrifuged the pectin floccules at 4,500 rpm for about 10 minutes to remove most of water and solvents. Then the centrifuged pectin floccules were lightly compacted and dried, for example, in an oven at about 55° C. and ground into powder.

The whole production method of the present invention is carried out at about 20° C. to about 50° C., preferably at room temperature, so the two types of endogenous pectin methylesterases of the raw materials exhibit optimum activity. The main process of the production of the LM pectin product through demethylation and transacylation can be effectively completed. The method involves simple steps, and the reaction time is very short. Accordingly, compared to traditional commercial pectin production, the advantages of the present invention include lower capital investment, stable quality and quantity of products, low energy consumption, and environmentally friendly products.

Moreover, the jelly fig-derived LM pectin obtained by the method of the present invention has strong specific calcium sensitivity, due to the homogalacturonan blocks with sufficient length blockwise distribution of free carboxyl groups (—COO$^-$), accordingly, the calcium pectate gel is formed through ionotropic gelation with calcium cations.

The present invention provides a jelly fig-derived LM pectin product, having the following characteristics:

(1) an average molecular weight of at least about 300,000 daltons;

(2) an esterification degree of less than about 50%; and (3) a galacturonic acid content of at least about 65%.

Owing to ionotropic gelation with calcium cations rather than sugar-acid dependence, this LM pectin is particularly suitable for manufacturing various jelly foods, such as sugar-free/low-sugar jam, jelly and the like, specifically for people with diabetes and obesity.

The present invention further provides a jelly fig-derived LM pectin product, having the following characteristics:

(1) an average molecular weight of at least about 750,000 daltons;

(2) an esterification degree of about 31% or less; and (3) a galacturonic acid content of about 75% to about 90%.

Thanks to relatively high average molecular weight, low esterification degree, and high galacturonic acid content, this LM pectin has the advantages of high gel strength, good hydrophilicity and the like, so as to potentially provide a novel matrix material applied in biomedical applications and related fields.

This LM pectin product and revolutionary production method of the present invention has the following industry significance:

(1) The LM pectin products of the present invention cross-linking with calcium ions in gelation are suitable for use in low-sugar or sugar-free processed food additives and biomedical materials.

(2) Compared to traditional pectin products, gel formation of the LM pectin product of the present invention can take place at room temperature at minimal concentration.

(3) Due to simple production method of the present invention, the capital investment to supply the plant and manufacturing facilities is much less than conventional pectin industries, and costs of production are also relatively low.

(4) According to the production method of the present invention, pectin extraction simply uses water with sodium citrate as an anticoagulation agent. In fact, there are great advantages of this eco-friendly production include reduced energy consumption and carbon dioxide emissions, comfortable working environment without environmental pollutions and the like.

The following examples are intended to describe the present invention, but are not intended to limit the scope of the present invention. Any modifications or variations that can be readily made by those skilled in the art shall fall within the scope of the disclosure of the specification and the appended claims.

EXAMPLES

Example 1

Water-Extraction Production Process of Jelly Fig-Derived LM Pectin at Room Temperature The whole process of the present example was carried out at room temperature (26° C.). A stainless steel spoon was used to scrape three parts of achenes, pedicels and sepals on the shell of female syconium of dry jelly fig, and 100 g of the three parts were weighed and put into a nylon filter bag, sieve pore size between 200 and 400 meshes.

Sodium citrate was added into reverse osmosis water to prepare an anticoagulation extraction solution according to the dosing ratio of a jelly fig raw material to sodium citrate being 5:1 and the weight-to-volume ratio of the jelly fig raw materials to the reverse osmosis water being 1:10, and the pH value was adjusted to 7.5 by citric acid.

The nylon filter bag filled with the jelly fig raw materials was placed into the prepared anticoagulation extraction solution and kneaded for 7 minutes, consequently obtaining the work-in-process LM pectin successfully converted in the crude aqueous extract by the effects of deesterification and transacylation, remaining in the state of fluid and anticoagulation.

A centrifuge (type: Allegra 21; manufacturer: Beckman Coulter, Inc.) was used to separate the work-in-process LM pectin from crude aqueous extract for 10 minutes at the speed of 4,500 rpm to remove most impurities. Supernatant was collected for the follow-up processes as follows.

The obtained supernatant, namely a liquid type of pectin, can present a final product of liquid-type LM pectin, with a degree of esterification about 31.0% and galacturonic acid content of about 80% and could be applied to downstream processed food/biomedical industries or direct consumer goods.

The obtained supernatant was mixed with the same volume of 95% alcohol, and LM pectin floccules were precipitated. A centrifuge (type: Allegra 21; manufacturer: Beckman Coulter, Inc.) was used to remove most of water and the alcohol from the pectin floccules for 10 minutes at the speed of 4,500 rpm, and then the pectin floccules were gently compacted into a block of wet pectin. The wet pectin block was put into an oven, dried at 55° C., and then ground into powder. The powder type of LM pectin with a degree of esterification about 29.8%, galacturonic acid content of about 78% and a yield rate of about 6%, could be applied to downstream processed food/biomedical industries or direct consumer goods.

Example 2

Determination of Molecular Weight of Jelly Fig-Derived LM Pectin

Gel permeation chromatography (GPC) was used to determine the molecular weights of the jelly fig-derived LM pectin of the present invention and commercial LM pectin. The analysis conditions were as follows:

(1) sample analysis: sample #1 was the jelly fig-derived LM pectin powder of Example 1, and sample #2 was commercial LM pectin (Pomona's Universal Pectin purchased from amazon.com.)

(2) flow phase: 50 mM of $NaNO_3$ (3) sample injection dose: 20 μL (4) sample pretreatment: (a) a sample was dissolved in 50 mM of $NaNO_3$, the concentration of the sample was 0.5 mg/mL; the sample was heated to 40° C., and was continuously stirred for 24 hours through a stirrer; (b) the sample was filtered through a 0.45 μm filter and then tested on a machine (5) flow speed: 0.5 ml/min (6) analysis temperature: 35° C.

The test result showed that the weight average molecular weight of sample #1 jelly fig-derived LM pectin of the present invention was 758,300 daltons, much higher than sample #2 commercial LM pectin with 247,310 daltons.

Example 3

Calcium Pectate Gel Bead Prepared by Powder-Type Jelly Fig-Derived LM Pectin

Materials and Preparation Method

Materials (1) A test tube filled with 10 ml of reverse osmosis water was provided, 100 mg of the powder-type jelly fig-derived LM pectin in Example 1 was dissolved in the test tube, so as to prepare its solution with the concentration being 1.0%.

(2) Two aqueous solutions of calcium ions with 50 ppm and 100 ppm respectively were prepared through calcium chloride.

Preparation Method (1) Two test tubes were filled with 5 ml of the solutions: one test tube with solution 50 ppm calcium ions, the other test tube with solution 100 ppm calcium ions.

(2) 0.5 ml of the prepared 1.0% pectin solution was dropped into the two test tubes filled with 5 ml calcium ions solutions by transfer pipette.

(3) As soon as the pectin solution droplets were dropped into the calcium ions solutions, the calcium pectate gel beads formed in the test tubes.

The test results are shown in FIG. 1, wherein FIG. 1(a) shows the cross-linked beads prepared by dropping in 50 ppm calcium ions solution, and FIG. 1(b) shows the cross-linked beads prepared by dropping in 100 ppm calcium ions solution. Outside the test tubes all wet beads remain intact after a finger-press test, that is, the powder-type LM pectin product of the present invention has the strong gelling property of calcium sensitivity.

Example 4

Calcium Pectate Gel Prepared by Powder-Type Jelly Fig-Derived LM Pectin

Materials and Preparation Method

Materials (1) Two test tubes each filled with 10 ml of reverse osmosis water were provided, and each dissolved with 100 mg of the jelly fig-derived LM pectin powder prepared in Example 1, so as to prepare two pectin solutions with the concentrations of both being 1.0%.

(2) Two aqueous solutions of calcium ions were prepared by calcium chloride: 50 ppm and 100 ppm respectively.

Preparation Method (1) Two test tubes each filled with 3 ml of the prepared calcium ion aqueous solutions being 50 ppm and 100 ppm, respectively, ready for the follow-up process.

(2) At room temperature, two test tubes each filled with 3 ml of the prepared 1% pectin solutions, homogenizedly mixed with 3 ml the prepared two calcium ion solutions which being 50 ppm and 100 ppm, respectively.

(3) At room temperature, the ionic-crosslinking reaction of the calcium/pectin complex remained in the test tubes for 10 minutes, and the calcium pectate gel formed.

Figure 2:
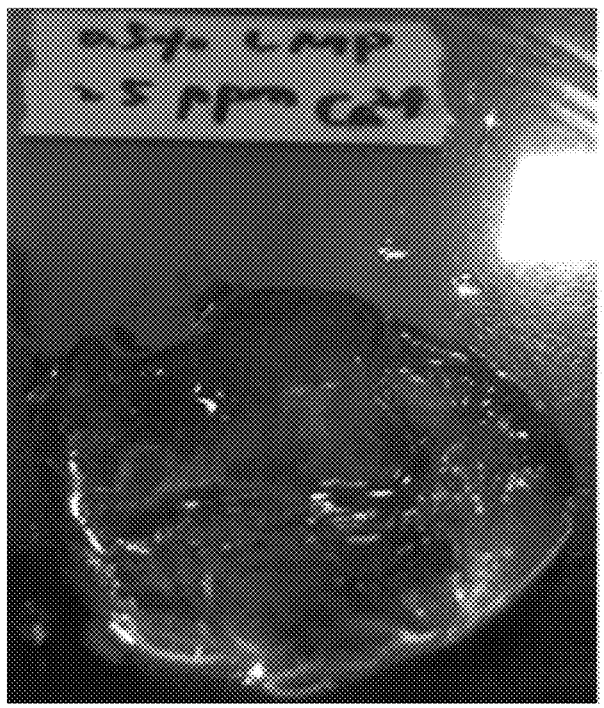
FIG. 2 shows deformation results of the calcium pectate gels after finger-press testing in Example 4, wherein (a) shows the partly deformed calcium pectate gel prepared by 0.5% pectin and 25 ppm calcium ions cross-linking, and (b) shows the partly deformed calcium pectate gel prepared by 0.5% pectin and 50 ppm calcium ions cross-linking.
Figure 2:
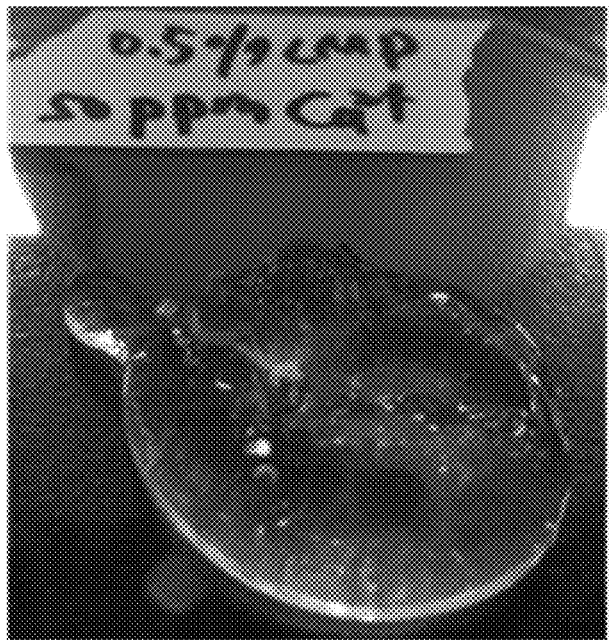

The deformation results of the cross-linked calcium pectate gels after finger-press test are shown in FIG. 2, wherein FIG. 2(a) shows the partly deformed calcium pectate gel prepared by 0.5% pectin and 25 ppm calcium ions cross-linking, and FIG. 2(b) shows the partly deformed calcium pectate gel prepared by 0.5% pectin and 50 ppm calcium ions cross-linking. Firstly, comparison of the appearances from the different cross-linking calcium ion concentrations 25 ppm and 50 ppm, showed almost the same in their transparency degree and conformational integrity, but after finger-press test for gel strength, that 25 ppm-gel is more soft and spreadable than 50 ppm-gel. Through this finger-press test also shows that adjusting calcium levels also can control the gelation properties of this jelly fig-derived LM pectin product of the present invention in application practice.

Example 5

Calcium Pectate Gel Bead Prepared by Supernatant (Liquid-Type Jelly Fig-Derived LM Pectin)

Materials and Preparation Method for Sodium Citrate Anticoagulation Extraction Solution (1) a sodium citrate anticoagulation extraction solution with concentration of 0.5% was prepared: 5 g of sodium citrate was dissolved in 1 L of single-distilled water; and (2) the pH value of the sodium citrate anticoagulation extraction solution was regulated to 7.5 by citric acid.

Materials and Preparation Method for Supernatant (Liquid-Type Jelly Fig-Derived LM Pectin)

(1) 40 ml of the sodium citrate anticoagulation extraction solution with the pH 7.5 and concentration 0.5% was provided, then 0.5 g of jelly fig raw materials was added to the solution with stirring for 2 hours by a magnet bar to obtain a crude aqueous extract of jelly fig-derived LM pectin with anticoagulation property; and (2) a centrifuge (type: Allegra 21; manufacturer: Beckman Coulter, Inc.) was used for centrifuging the crude aqueous extract for 10 minutes at the speed of 4,500 rpm to remove most of impurities, so as to collect a supernatant of the jelly fig-derived LM pectin.

Preparation Method for Calcium Pectate Gel Bead (1) 0.5 ml of the above collected supernatant of the jelly fig-derived LM pectin was dropped by a transfer pipette into a test tube filled with 3 ml of a calcium chloride aqueous solution with the calcium ion concentration being 1000 ppm; and (2) Upon the supernatant droplets dropped into the calcium ions solutions, the calcium pectate gel beads immediately formed in the test tubes.

Figure 3:
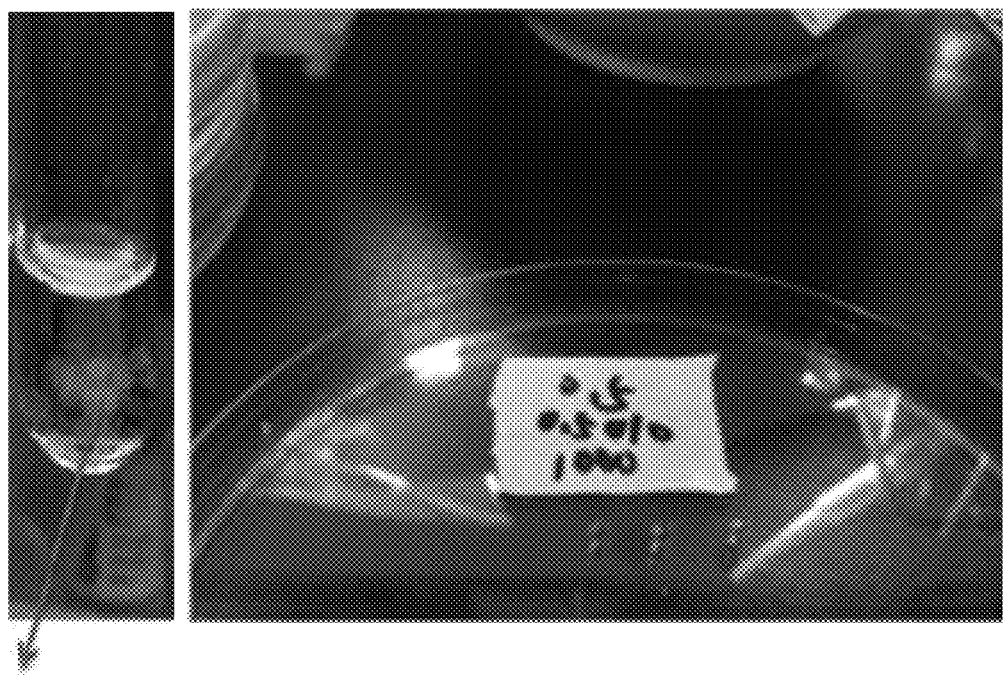
FIG. 3 shows the morphology of stabilized and hardened calcium pectate gel beads prepared by dropping in 1000 ppm calcium ions solution, cross-linked liquid-type jelly fig-derived LM pectin, namely the supernatant in Example 5.

The test results are shown in FIG. 3. The cross-linked beads 10 of supernatant of the jelly fig-derived LM pectin were well shaped by 1000 ppm calcium ions cross-linking. Outside the test tubes all wet beads remain intact after a finger-press test, that is, the supernatant has strong gelling property of calcium sensitivity to be the liquid-type jelly fig-derived LM pectin product of the present invention.

Accordingly, various modifications may be made without departing from the present invention when the specific embodiments of the present invention described herein for purposes of illustration have been understood. In addition, aspects of the present invention described in the context of particular embodiments or examples may be combined or eliminated in other embodiments. Although the advantages related to specific embodiments of the present invention have been described in the context of such embodiments, other embodiments may also demonstrate these advantages. In addition, not all embodiments shall demonstrate such advantages falling within the scope of the present invention. Therefore, in addition to being limited by the appended claims, the present invention is not limited.

SYMBOL DESCRIPTION 10 calcium pectate gel beads

What is claimed is:

1. A method of producing a low methoxyl pectin (LM pectin) from jelly fig, which comprises the steps of:
    (a) providing jelly fig raw materials comprising female syconium of jelly fig;
    (b) providing an anticoagulation extraction solution comprising sodium citrate, an organic acid and pure water, in which sodium citrate is added as an anticoagulation agent and the organic acid is added to adjust the pH value of the anticoagulation extraction solution to about 6 to about 8;
    (c) extracting the jelly fig raw materials with the anticoagulation extraction solution at a temperature of about 20° C. to about 50° C. to obtain a crude aqueous extract of jelly fig pectin; and
    (d) centrifuging the crude aqueous extract of jelly fig pectin to collect supernatant, pectin precipitated by organic solvent, or both;
    wherein the low methoxyl pectin has the characteristics of:
    (1) an average molecular weight of at least 750,000 daltons;
    (2) an esterification degree of less than 50%; and
    (3) a galacturonic acid content of at least 65%.

2. The method of claim 1, wherein the jelly fig raw materials comprise fresh or dry female syconium of the jelly fig, the female syconium comprising its inner achenes, pedicels, and sepals.

3. The method of claim 2, wherein the fresh jelly fig raw materials and the sodium citrate are present in a dosing ratio (w/w) ranging from about 1:20 to about 20:1.

4. The method of claim 3, wherein the fresh jelly fig raw materials and the sodium citrate are present in a dosing ratio (w/w) of about 12.5:1.

5. The method of claim 2, wherein the dry jelly fig raw materials and the sodium citrate are present in a dosing ratio (w/w) ranging from about 1:10 to about 10:1.

6. The method of claim 5, wherein the dry jelly fig raw materials and the sodium citrate are present in a dosing ratio (w/w) of about 5:1.

7. The method of claim 2, wherein the fresh jelly fig raw materials and the anticoagulation extraction solution are present in a dosing ratio (w/v) ranging from about 1:150 to about 1:2.

8. The method of claim 7, wherein the fresh jelly fig raw materials and the anticoagulation extraction solution are present in a dosing ratio (w/v) of about 1:4.

9. The method of claim 2, wherein the dry jelly fig raw materials and the anticoagulation extraction solution are present in a dosing ratio (w/v) ranging from about 1:200 to about 1:5.

10. The method of claim 9, wherein the dry jelly fig raw materials and the anticoagulation extraction solution are present in a dosing ratio (w/v) of about 1:10.

11. The method of claim 1, wherein in step (c), an extraction time ranges from about 1 minute to about 2 hours.

12. The method of claim 11, wherein the jelly fig raw materials are extracted manually for about 7 minutes.

13. The method of claim 11, wherein the jelly fig raw materials are extracted in a mechanical device for about 7 minutes.

14. The method of claim 1 further comprising after step (d):
    centrifuging the precipitated pectin floccules, lightly compacting and drying the centrifuged pectin floccules, and grinding the dried pectin floccules into powder to serve as a powder-type LM pectin product.

15. A low methoxyl pectin, which has the characteristics of:
    (1) an average molecular weight of at least 750,000 daltons;
    (2) an esterification degree of less than 50%; and
    (3) a galacturonic acid content of at least 65%,
    wherein the low methoxyl pectin is a jelly fig-derived low methoxyl pectin.

16. The low methoxyl pectin of claim 15, which has the characteristics of:
    (1) an average molecular weight of at least 750,000 daltons;
    (2) an esterification degree of about 31% or less; and
    (3) a galacturonic acid content of 75% to about 90%.

17. A low methoxyl pectin, which has the characteristics of:
    (1) an average molecular weight of at least 750,000 daltons;
    (2) an esterification degree of less than 50%; and
    (3) a galacturonic acid content of at least 65%,
    wherein the low methoxyl pectin is a jelly fig-derived low methoxyl pectin, and is produced by a method comprising the steps of:
    (a) providing jelly fig raw materials comprising female syconium of jelly fig;
    (b) providing an anticoagulation extraction solution comprising sodium citrate, an organic acid and pure water, in which sodium citrate is added as an anticoagulation agent and the organic acid is added to adjust the pH value of the anticoagulation extraction solution to about 6 to about 8;
    (c) extracting the jelly fig raw materials with the anticoagulation extraction solution at a temperature of about 20° C. to about 50° C. to obtain a crude aqueous extract of jelly fig pectin; and
    (d) centrifuging the crude aqueous extract of jelly fig pectin to collect supernatant, pectin precipitated by organic solvent, or both.

* * * * *